(12) United States Patent
Hon

(10) Patent No.: US 7,730,676 B2
(45) Date of Patent: Jun. 8, 2010

(54) SOLAR PANEL SUPPORTING SYSTEM

(76) Inventor: Wai Man Hon, Flat F, 24$^{th}$ Floor, Tower 1, Ocean Court, Praya Road, Aberdeen (HK)

( * ) Notice: Subject to any disclaimer, the term of this patent is extended or adjusted under 35 U.S.C. 154(b) by 78 days.

(21) Appl. No.: 11/936,804

(22) Filed: Nov. 8, 2007

(65) Prior Publication Data
US 2009/0120016 A1 May 14, 2009

(51) Int. Cl.
E04D 13/18 (2006.01)
(52) U.S. Cl. ............. 52/173.3; 136/244; 126/570; 126/571
(58) Field of Classification Search ............ 52/18, 52/173.3, 646, 648.1; 136/244, 246; 126/570, 126/571
See application file for complete search history.

(56) References Cited

U.S. PATENT DOCUMENTS

| 292,198 | A | * | 1/1884 | Barstow | 353/3 |
| 4,172,739 | A | * | 10/1979 | Tassen | 136/246 |
| 4,187,123 | A | * | 2/1980 | Diggs | 136/206 |
| 4,402,582 | A | * | 9/1983 | Rhodes | 353/3 |
| 4,508,426 | A | * | 4/1985 | Hutchison | 359/852 |
| 4,995,377 | A | * | 2/1991 | Eiden | 126/605 |
| 5,191,875 | A | * | 3/1993 | Edling et al. | 126/576 |
| 5,228,924 | A | * | 7/1993 | Barker et al. | 136/246 |
| 6,563,040 | B2 | * | 5/2003 | Hayden et al. | 136/244 |
| 7,104,064 | B2 | | 9/2006 | Hon | |
| 7,444,816 | B2 | | 11/2008 | Hon | |

* cited by examiner

Primary Examiner—Richard E Chilcot, Jr.
Assistant Examiner—Anthony N Bartosik

(57) ABSTRACT

A solar panel supporting system includes a main frame, a solar panel, and a spring mechanism. The main frame has two opposite lateral sides. The solar panel is pivotally mounted on the main frame along a first pivot axis defined by a first rod extending between the opposite lateral sides of the main frame. The spring mechanism is operatively coupled to the solar panel for resiliently holding the solar panel at a predetermined position. The solar panel is adapted to pivot in response to wind strong enough to stretch or compress the spring mechanism.

6 Claims, 11 Drawing Sheets

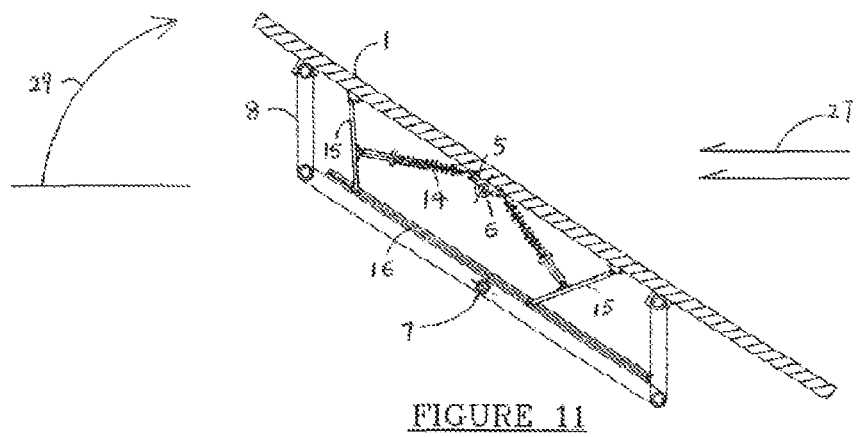
FIGURE 11
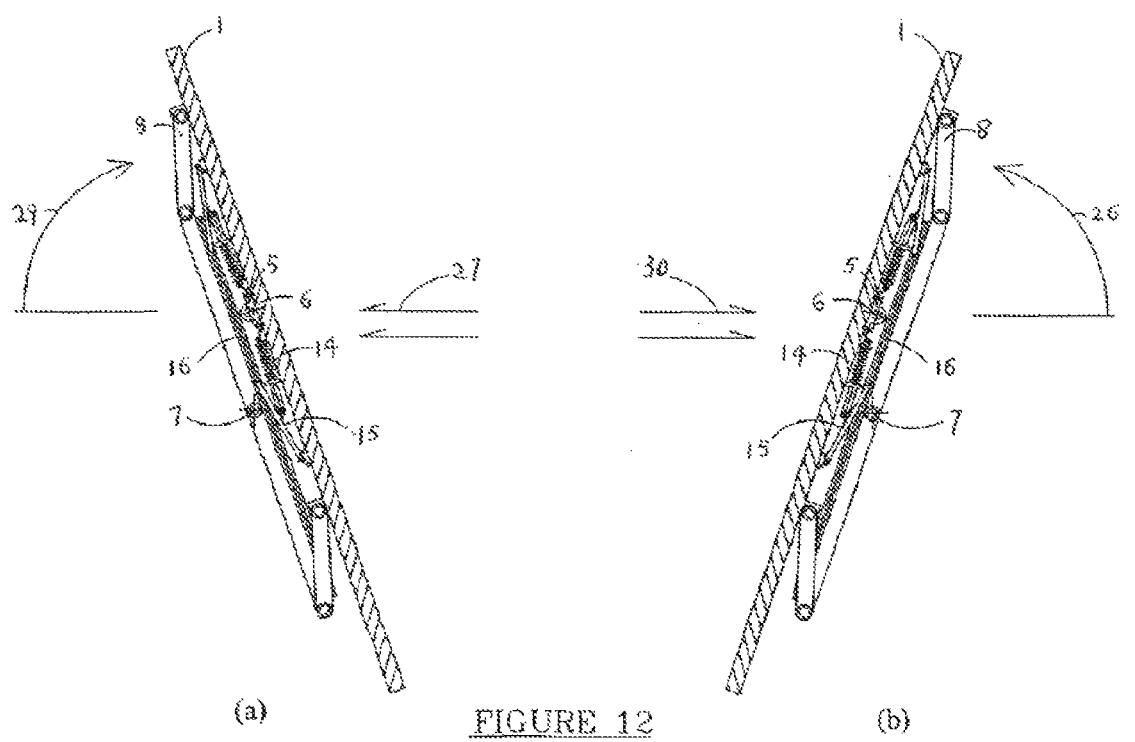
(a) FIGURE 12 (b)

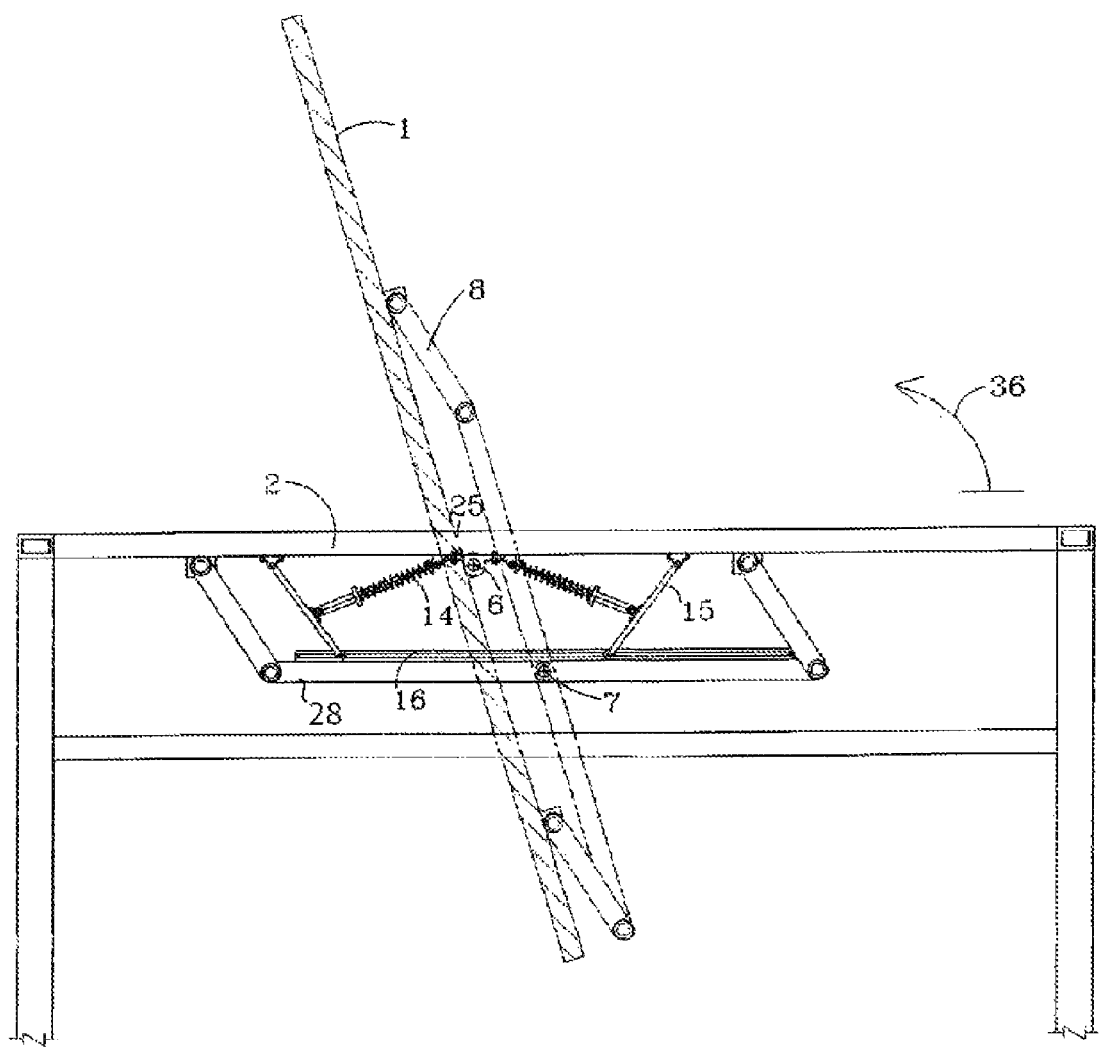
FIGURE 13(c)
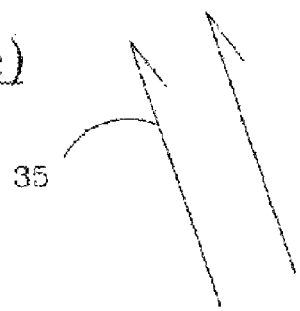

SOLAR PANEL SUPPORTING SYSTEM

The present application relates to a solar panel supporting system.

BACKGROUND

Solar panel supporting system is used to support solar panels for the collection of solar energy. Solar panels can usually be adjusted into a fixed position relative to the solar panel supporting system. However, these fixed solar panels are subjected to strong wind which can damage the solar panels.

There is a need to provide an improved solar panel supporting system where the solar panels can pivot and yield in response to strong wind thereby reducing the impact of strong wind against the solar panels.

SUMMARY

A solar panel supporting system includes a main frame, a solar panel, and a spring mechanism. The main frame has two opposite lateral sides. The solar panel is pivotally mounted on the main frame along a first pivot axis defined by a first rod extending between the opposite lateral sides of the main frame. The spring mechanism is operatively coupled to the solar panel for resiliently holding the solar panel at a predetermined position. The solar panel is adapted to pivot in response to wind strong enough to stretch or compress the spring mechanism.

BRIEF DESCRIPTION OF THE DRAWINGS

FIGS. 11, 12(a), and 12(b) show the pivotal movement of the solar panel and the collapsing of the collapsible frame in response to wind from different directions.

DETAILED DESCRIPTION

Reference will now be made in detail to an embodiment of the solar panel supporting system. Exemplary embodiments of the solar panel supporting system are described in detail, although it will be apparent to those skilled in the relevant art that some features that are not particularly important to an understanding of the solar panel supporting system may not be shown for the sake of clarity.

Furthermore, it should be understood that the solar panel supporting system is not limited to the illustrated embodiments described below and that various changes and modifications thereof may be effected by one skilled in the art without departing from the spirit or scope of the disclosure and the appended claims. For example, elements and/or features of different illustrative embodiments may be combined with each other and/or substituted for each other within the scope of this disclosure and appended claims.

It should be noted that throughout the specification and claims herein, when one element is the to be "connected" or "coupled" to another, this does not necessarily mean that one element is fastened, secured, or otherwise attached to another element. Instead, the term "connected" or "coupled" means that one element is either connected directly or indirectly to another element or is in mechanical or electrical communication with another element.

Figure 1:
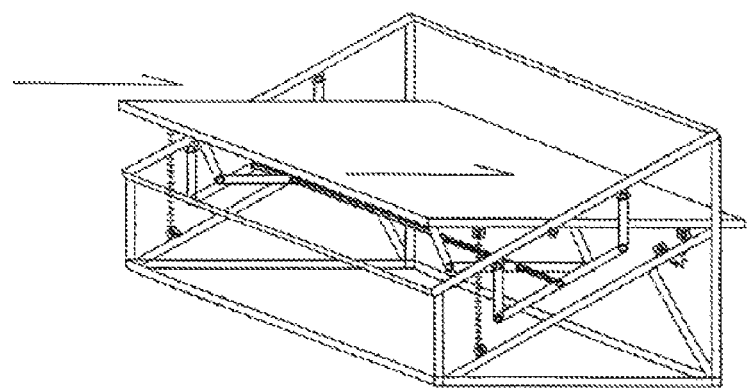
FIG. 1 is a top perspective view of a solar panel supporting system according to an embodiment disclosed in the present application.
Figure 3:
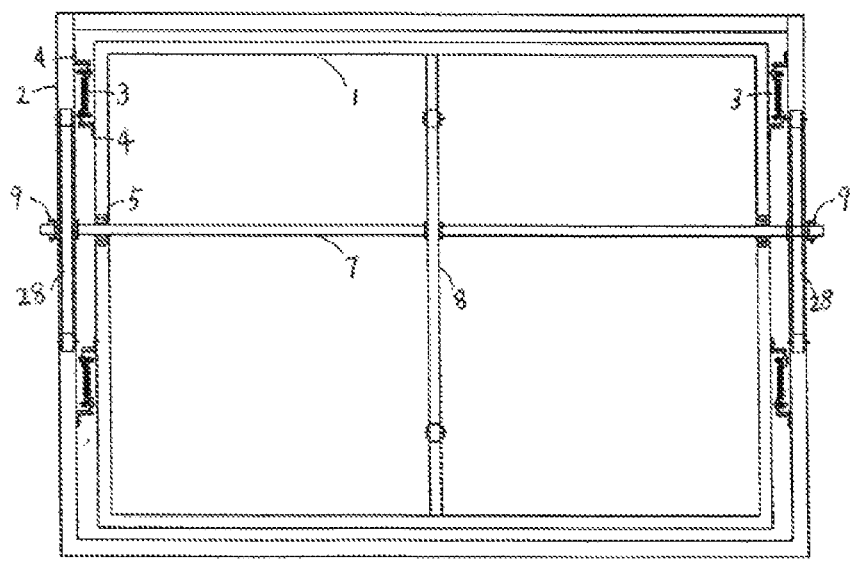
FIG. 3 is a bottom view of the solar panel supporting system.

Referring to the drawings, in which like reference numerals represent like parts throughout the drawings, FIGS. 1 and 3 are top perspective and bottom views of the solar panel supporting system respectively according to an embodiment disclosed in the present application. The solar panel supporting system includes a solar panel 1 and a main frame 2.

The solar panel 1 is pivotally mounted on the main frame 2 along a first pivot axis defined by a first rod 6 extending between the two opposite lateral sides of the main frame 2. The first pivot axis defined by the first rod 6 may be disposed parallel to and at a distance from a central transverse axis of the solar panel 1.

Figure 6:
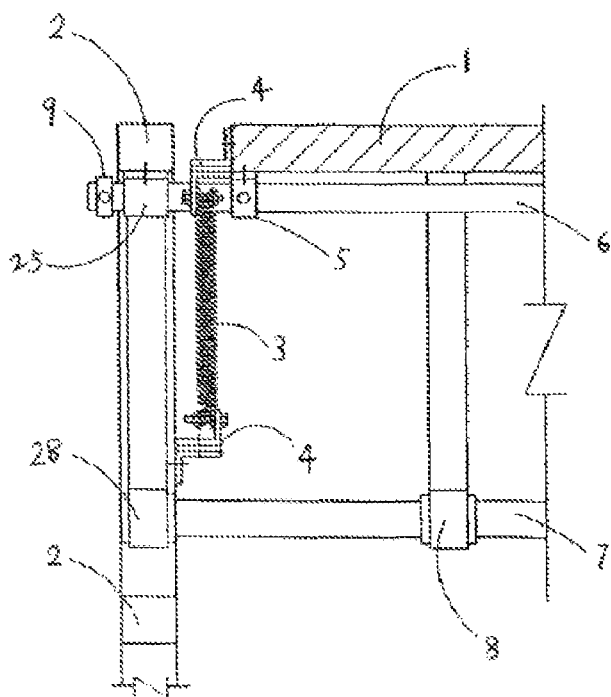
FIG. 6 is an enlarged end view of the tension spring.

The first rod 6 is journaled through circular openings of mounting brackets 5 which are fixed to the opposite side edges of the solar panel 1. The mounting brackets 5 may be fixed at a location about ⅓ of the length of the lateral side edge of the solar panel 1. The first rod 6 also journaled through circular openings of mounting brackets 25 which are fixed to the opposite side edges of the main frame 2, as best illustrated in FIG. 6.

In response to impact of strong wind, the solar panel 1 pivots about the first pivot axis defined by the first rod 6. Each end of the first rod 6 is provided with an annular sleeve or washer 9 which is fastened to the first rod 6 by nuts and bolts extending through openings of the annular sleeve or washer 9.

Figure 4:
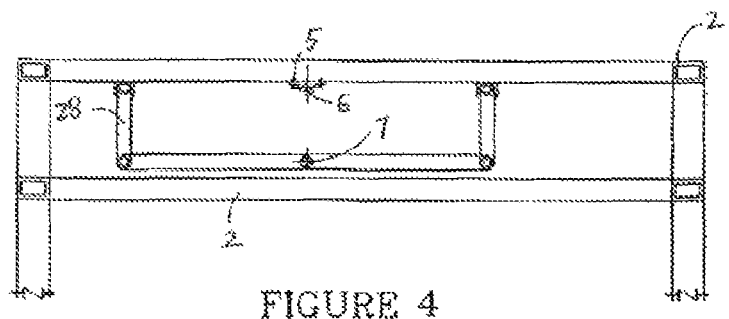
FIG. 4 shows a lateral collapsible frame being provided on a main frame of the solar panel supporting system.

FIG. 4 shows a lateral collapsible frame 28 being mounted to each of the two opposite lateral sides of the main frame 2 of the solar panel supporting system to define a parallelogram collapsible frame structure.

Figure 2:
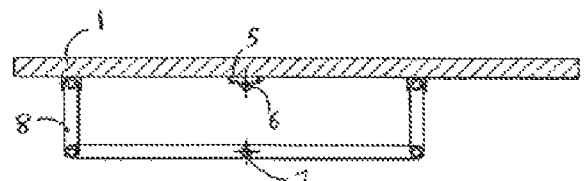
FIG. 2 shows a collapsible frame being hingedly connected to a solar panel of the solar panel supporting system.

The lateral collapsible frame 28 of FIG. 4 is the same as collapsible frame 8 of FIG. 2 except that the lateral collapsible frame 28 is connected to the main frame 2 whereas the collapsible frame 8 is connected to the solar panel 1.

At least one collapsible frame 8 is hingedly connected to a lower surface of the solar panel 1. The solar panel 1 is pivotally coupled to the lateral frames 28 along a second pivot axis defined by a second rod 7 journaled through the collapsible frame 8 and attached to the lateral collapsible frames 28. The second rod 7 may be disposed parallel to and in a vertically spaced apart relationship with the first rod 6. The second rod 7 is employed to securely support the solar panel 1 on the main frame 2 as well as to keep the solar panel 1 in operation in case the first rod 6 is broken.

The solar panel supporting system may have one collapsible frame 8 located at the middle of the length of the first and second rods 6, 7, as illustrated in FIG. 3. The solar panel supporting system may have two collapsible frames 8 provided near the opposite ends of the first and second rods 6, 7, as illustrated in FIGS. 1 and 6.

Figure 5:
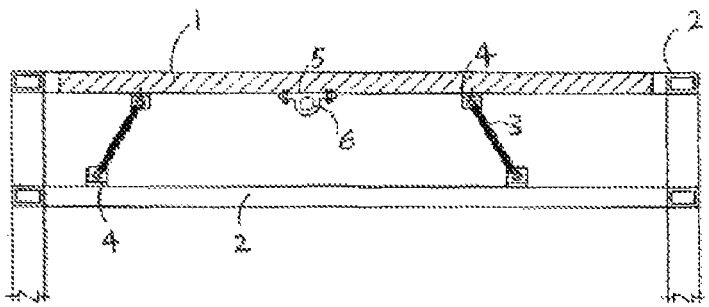
FIG. 5 shows two tension springs being connected to and extending between the solar panel and the main frame of the solar panel supporting system.
Figure 7:
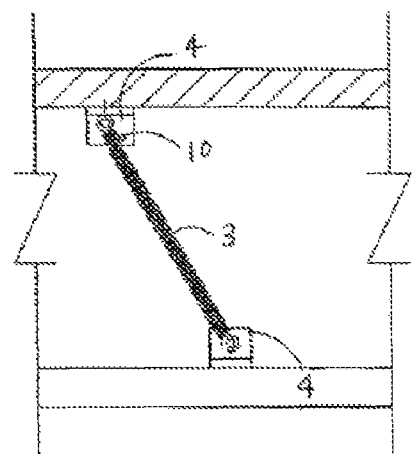
FIG. 7 is an enlarged side view of the tension spring.

FIGS. 5, 6 and 7 show a spring mechanism being connected to and extending between the solar panel 1 and the main frame 2 of the solar panel supporting system. The spring mechanism is operatively coupled to the solar panel 1 and the main frame 2 for resiliently maintaining the solar panel 1 at a predetermined position. The solar panel 1 is adapted to pivot either clockwise or anticlockwise in response to wind strong enough to stretch or compress the spring mechanism, and return to the position when wind diminishes.

According to an embodiment disclosed in the present application the spring mechanism includes a pair of tension springs 3 provided at each lateral side of the main frame 2. Each pair of tension springs 3 is connected to and extending between the solar panel 1 and the main frame 2 and disposed at two opposite sides of the first rod 6 respectively.

One end of the tension spring 3 is fixed to the lateral side of the main frame 2 and the other end of the tension spring 3 is fixed to the lateral side edge of the solar panel 1. Each end of the tension spring 3 may be connected to a steel angle 4 which is fastened to the solar panel 1 and the main frame 2 by conventional nuts and bolts. Conventional rubber cushions may be employed to absorb the spring rebound force.

Figure 8:
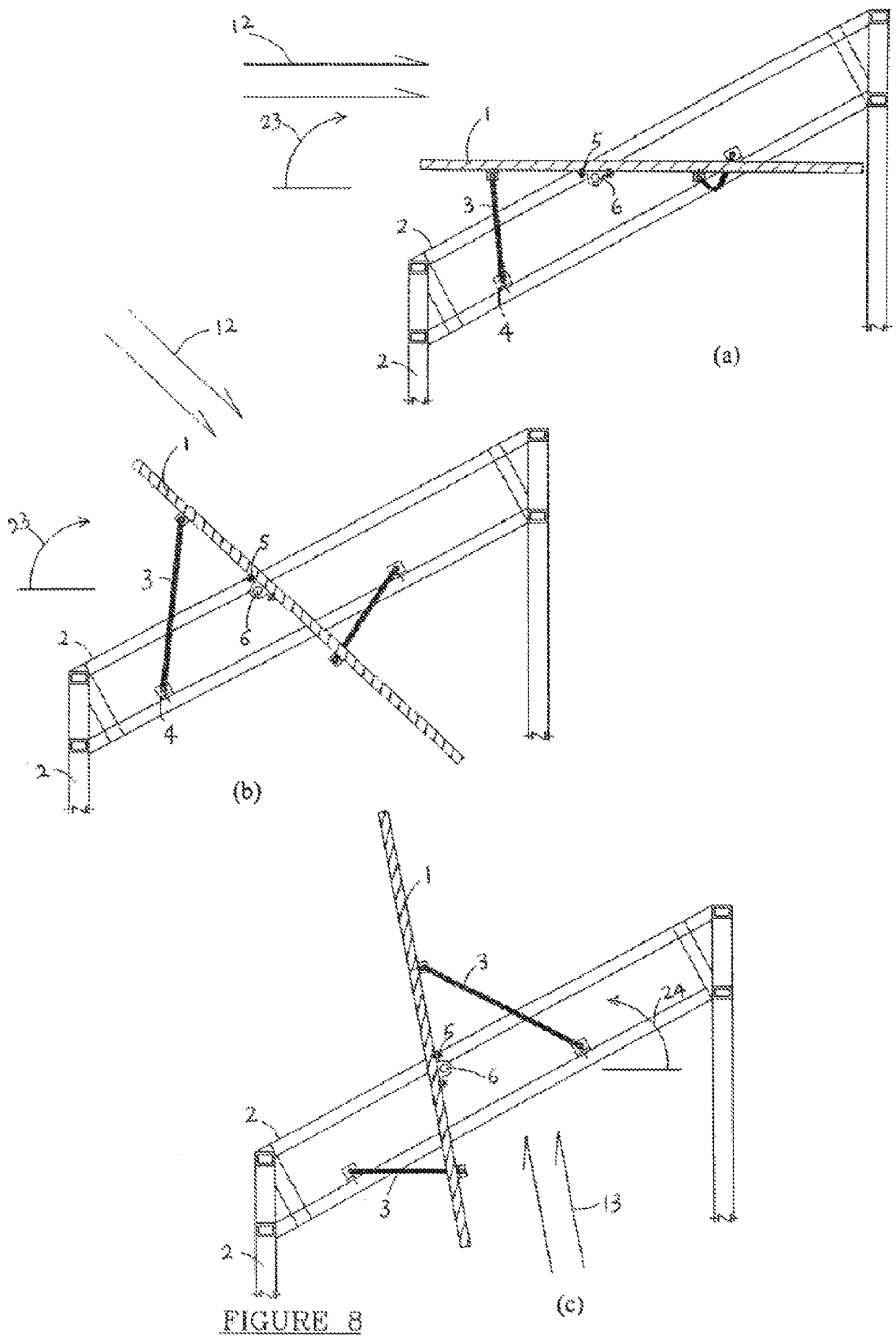
FIGS. 8(a), (b) and (c) are diagrams showing the pivotal movement of the solar panel in response to wind from different directions.

FIGS. 8(*a*), (*b*) and (*c*) are diagrams showing the pivotal movement of the solar panel 1 in response to wind from different directions.

When the wind force is greater than the predetermined spring force the solar panel 1 pivots clockwise as shown by the arrow 23 in FIG. 8(*a*) in response to wind blowing in the direction indicated by arrows 12. The tension spring 3 at the left hand side stretches to a tension state, and the tension spring 3 at the right hand side turns into a bending state.

In response to wind blowing in the direction indicated by arrows 12, the solar panel 1 pivots clockwise as shown by the arrow 23 in FIG. 8(*b*). The tension spring 3 at the left hand side stretches to a more tension state, and the tension spring 3 at the right hand side also stretches to a tension state.

In response to wind blowing in the direction indicated by arrows 13, the solar panel 1 pivots anticlockwise as shown by the arrow 24 in FIG. 8(*b*). The tension spring 3 at the left hand side stretches to a tension state, and the tension spring 3 at the right hand side also stretches to a tension state.

The solar panel 1 is adapted to return to the original predetermined position by the restoring force of the tension springs 3 once the wind diminishes.

Figure 9:
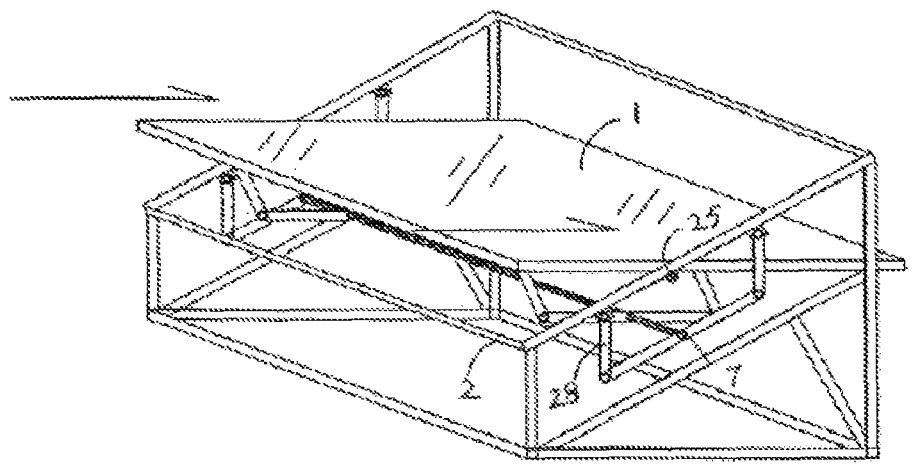
FIG. 9 is top perspective view of a solar panel supporting system similar to the solar panel supporting system of FIG. 1 without showing the tension springs.
Figure 10:
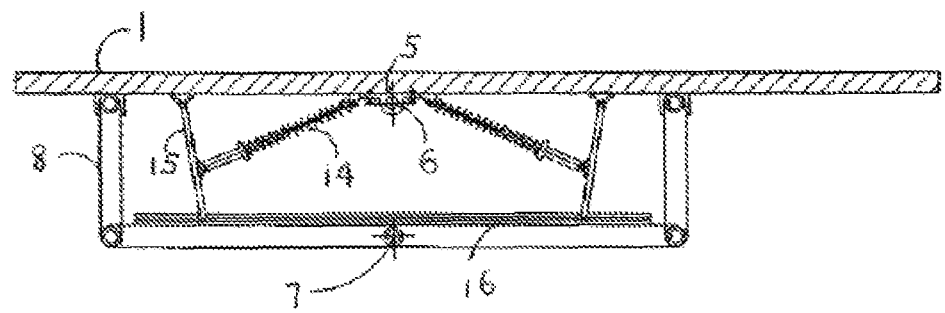
FIG. 10 shows a pair of vibration absorbers with compression springs being provided between the solar panel and a collapsible frame of the solar panel supporting system.

FIG. 10 shows a pair of vibration absorbers with compression springs 14 being mounted between the solar panel 1 and the collapsible frame 8 of the solar panel supporting system depicted in FIG. 9, which is the same as the solar panel supporting system depicted in FIG. 1, except that the tension springs 3 have been omitted.

It is appreciated that great restoring force exists when the tension springs 3 rebound to the original predetermined position when strong wind diminishes. This rebound force may cause damages to the solar panel 1.

One way to absorb this rebound force is to fix a steel bolt 10 in a corner position of the steel angle 4 as shown in FIG. 7. The bolt 10 is adapted to bend the tension spring 3 as shown in FIG. 7. The bending tension spring 3 serve to absorb the force exerted on the tension spring 3 without directly transferring the force to the steel angle 4 causing vibrating impact on the solar panel 1 and the main frame 2.

In addition, the vibration absorbers with compression springs 14 can be mounted on the collapsible frame 8 to control and reduce the rebound force. The vibration absorbers with compression springs 14 can be the same in function and size as those used in bicycles or motorcycles.

One end of the vibration absorber with compression spring 14 is hingedly connected to the solar panel 1 and the other end is hingedly connected to a steel bar 15 at a position near one end thereof. One end of the bar 15 is also hingedly connected to the solar panel 1 and the other end of the bar 15 is slidably coupled to a track 16 by a roller bearing assembly. The track 16 is mounted on a lower frame member of the collapsible frame 8 parallel to the lateral side edge of the solar panel 1.

When the solar panel 1 pivots in response to wind, the collapsible frame 8 collapses, the bars 15 slide inwards towards each other along the track 16, and the compression springs 14 of the vibration absorbers 14 compress.

When the wind force is zero (without wind), the compression springs 14 of the vibration absorbers are at their fully extended state. The two vibration absorbers with compression springs 14 are in generally inverted V-shaped orientation. The two vibration absorbers and the two bars 15 are in generally W-shaped orientation in an equilibrium state, as shown in FIG. 10.

FIGS. 11, 12(*a*) and 12(*b*) show the pivotal movement of the solar panel 1 and the collapsing of the collapsible frame 8 in response to wind from different directions When wind force 27 increases from zero, the solar panel 1 pivots clockwise as shown by the arrow 29 and the collapsible frame 8 collapses, as shown in FIG. 11. When the collapsible frame 8 collapses, the bars 15 move inwards towards each other, and the compression springs 14 of the vibration absorbers compress. The solar panel 1 pivots clockwise until the collapsible frame 8 totally collapses as shown in FIG. 12(*a*).

If the wind direction 27 changes to the direction 30 as shown in FIG. 12(*b*), the solar panel 1 pivots anticlockwise as shown by the arrow 26.

When wind diminishes, restoring force of the compression springs 14 in the vibration absorbers pushes the collapsible frame 8 to the equilibrium state and the solar panel 1 back to the original predetermined position as shown in FIG. 10.

The solar panel supporting system may have one pair of compression springs 14 in one collapsible frame 8 located at the middle of the length of the first and second rods 6, 7, as illustrated in FIG. 3. The solar panel supporting system may have two pairs of compression springs 14 in the two collapsible frames 8 provided at the two opposite ends of the first and second rods 6, 7 respectively, as illustrated in FIG. 9.

As shown in FIGS. 12(*a*) and (*b*), the collapsible frame 8 totally collapses when solar panel 1 pivots clockwise up to about 90 degrees, or pivots anticlockwise up to about 90 degrees from the original predetermined position.

Figure 13A:
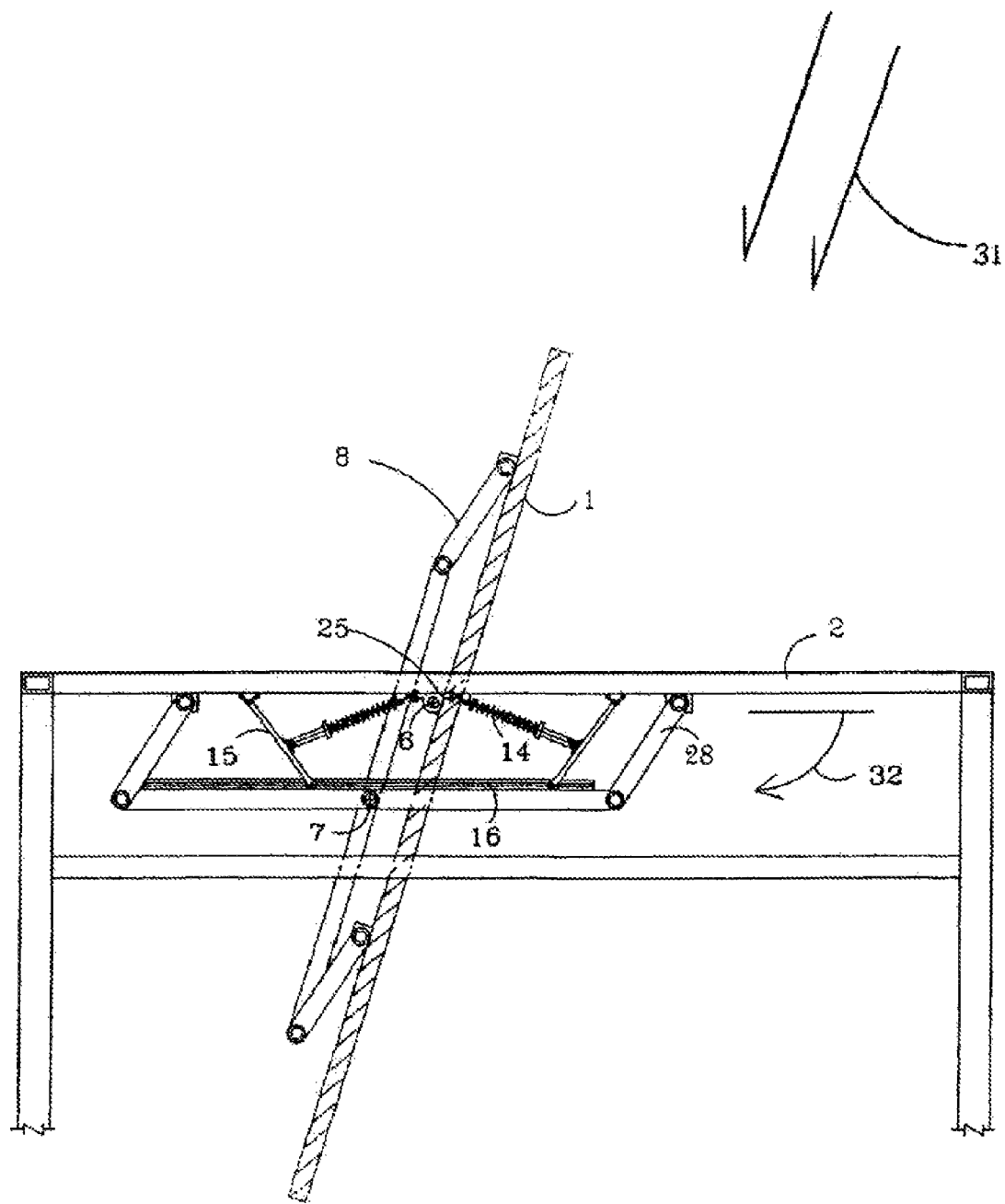
FIGS. 13(a), (b), (c) and (d) show the pivotal movement of a solar panel on a solar panel supporting system according to another embodiment disclosed in the present application.
Figure 13B:
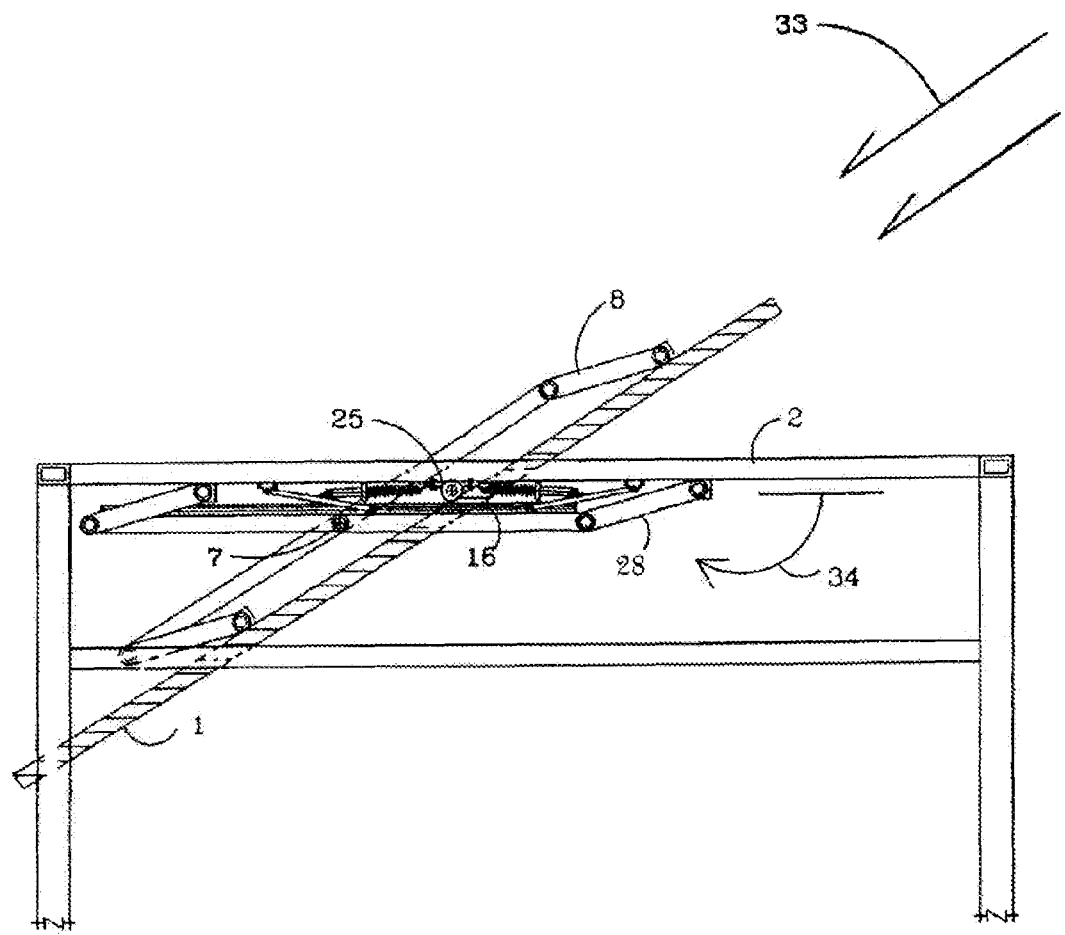
Figure 13D:
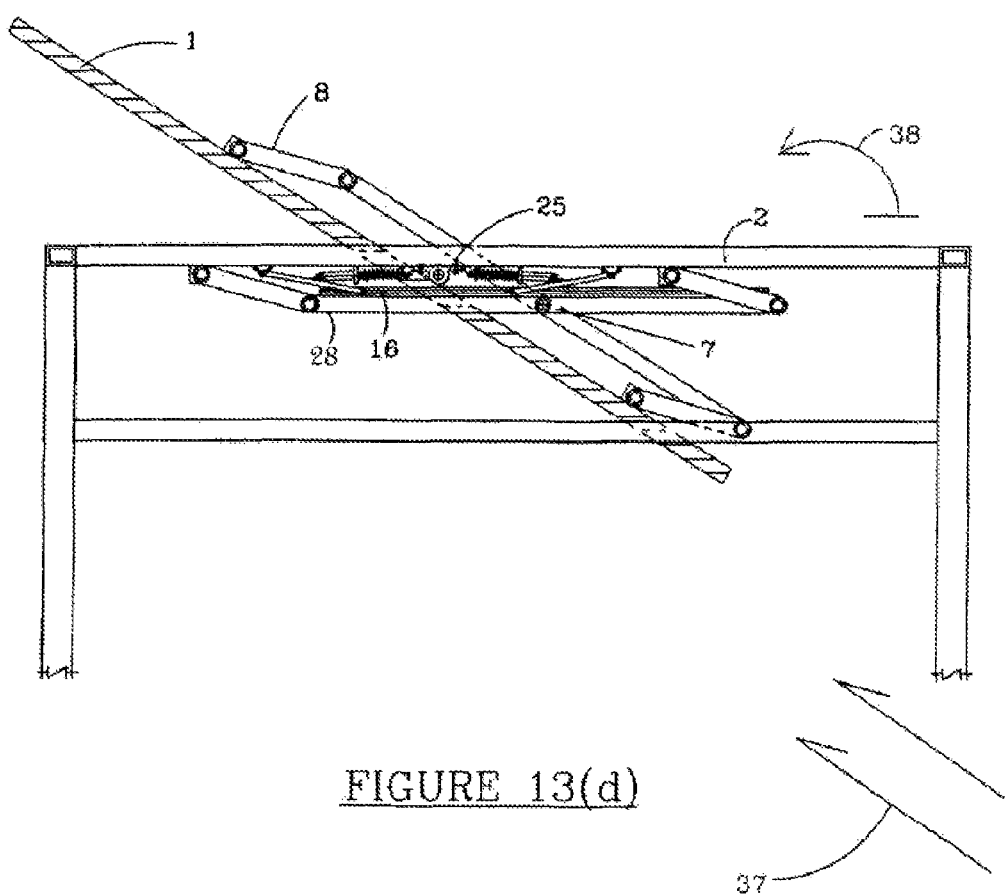

FIGS. 13(*a*), (*b*), (*c*) and (*d*) show the pivotal movement of a solar panel on a solar panel supporting system according to another embodiment disclosed in the present application.

As shown in FIG. 13(*a*), a lateral collapsible frame 28 is hingedly connected to a top frame member of the main frame 2 at each lateral side thereof to define a parallelogram collapsible frame structure. The solar panel 1 is pivotally coupled to the main frame 2 along the second pivot axis defined by the second rod 7. The second rod 7 is journaled through an opening of the collapsible frame 8. Each of the two opposite ends of the second rod 7 is attached to a lower frame member of the lateral collapsible frame 28 parallel to an upper frame member of the main frame 2, as depicted in FIG. 9.

A pair of vibration absorbers with compression springs 14 can be coupled to each lateral collapsible frame 28 to control and reduce the rebound force. One end of the vibration absorber with compression spring 14 is hingedly connected to the top frame member of the main frame 2 and the other end is hingedly connected to a steel bar 15 at a position near one end thereof. One end of the bar 15 is also hingedly connected to the top frame member of the main frame 2 and the other end of the bar 15 is slidably coupled to a track 16 by a roller bearing assembly. The track 16 is mounted on the lower frame member of the lateral collapsible frame 28 parallel to the upper frame member of the main frame 2.

In response to wind blowing in the direction 31, as shown in FIG. 13(*a*), the solar panel 1 pivots clockwise and the second rod 7, being fixed to the lateral collapsible frame 28, starts pushing the lateral collapsible frame 28 in the clockwise direction 32. As the lateral collapsible frame 28 collapses, the bars 15 move inwards toward each other and the compression springs 14 of the vibration absorbers compress.

In response to wind further blowing in the direction 33, as shown in FIG. 13(*b*), the solar panel 1 further pivots clockwise as shown by arrow 34, and the lateral collapsible frame 28 almost totally collapses.

If the wind directions 31, 33 change to wind directions 35, 37, as shown in FIGS. 13(*c*) and (*d*), the solar panel 1 pivots anticlockwise as shown by the arrows 36, 38. The way the lateral collapsible frame 28 collapses is the same except that it collapses in the other direction.

If wind blows in the directions 31, 33, as shown in FIGS. 13(*a*) and (*b*), solar panel 1 pivots clockwise more than 90 degrees and up to about 180 degrees from the original predetermined position. If wind blows in the directions 35, 37, as shown in FIGS. 13(*c*) and (*d*), solar panel 1 rotates anticlockwise more than 90degrees and up to about 180 degrees from the original predetermined position. It can be seen that the solar panel supporting system with lateral collapsible frames 28 permits the solar panel 1 to pivot a further 90 degrees clockwise, or a further 90 degrees anticlockwise, as compared to the embodiment in FIGS. 12(*a*) and (*b*).

Figure 14:
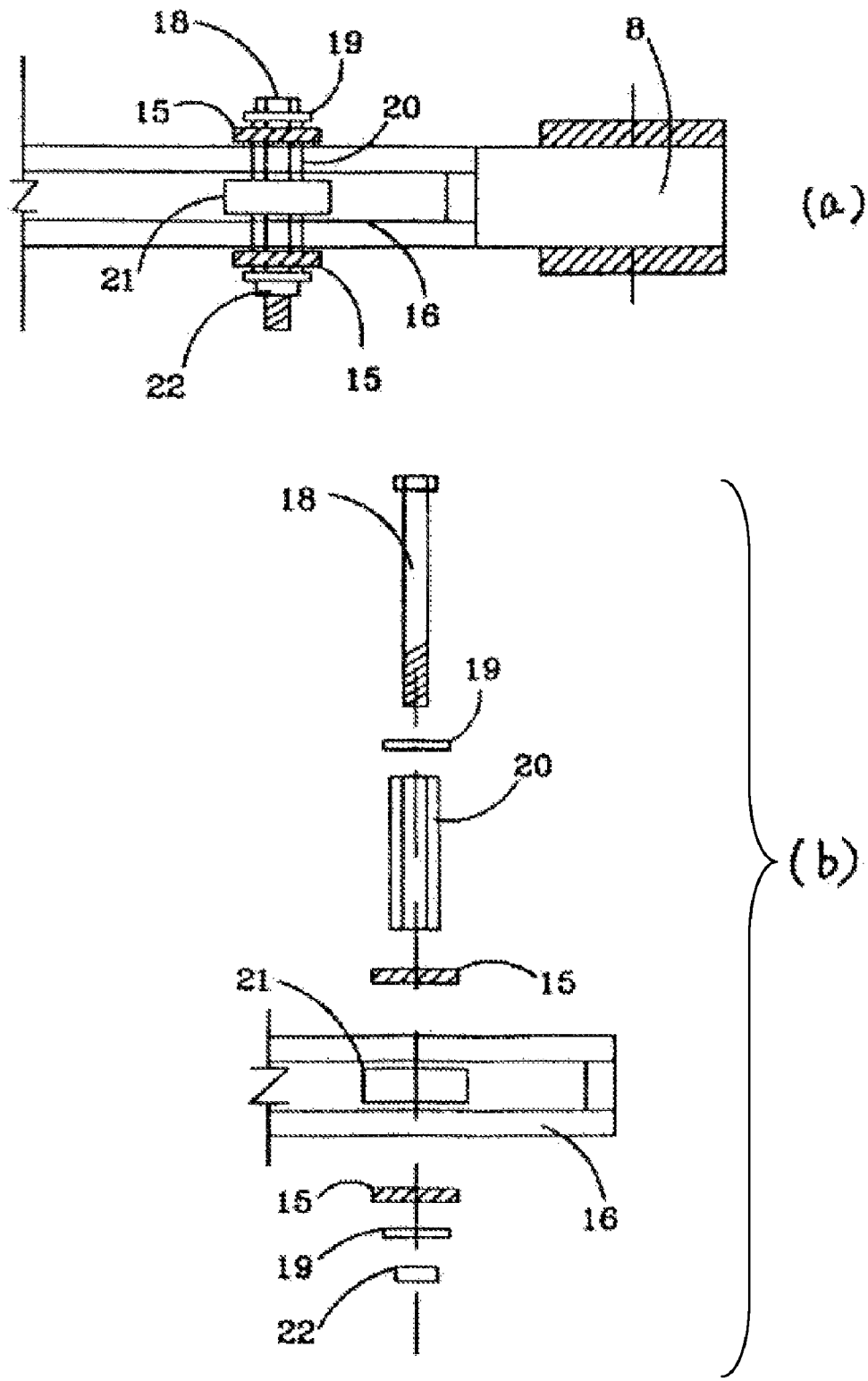
FIG. 14(a) is an enlarged view of a roller bearing assembly.
FIG. 14(b) is an exploded view of the roller bearing assembly.

FIGS. 14(*a*) and 14(*b*) are enlarged view and exploded view of the roller bearing assembly respectively.

The roller bearing assembly has a bolt 18 which is adapted to be inserted through openings of washer 19 and cylindrical tube 20 from one side of the roller bearing assembly. The bolt 18 and tube 20 are inserted through openings of one side the bar 15, track 16, and roller bearing 21. The bolt 18 and tube 20 are then inserted into the other side of the bar 15 which is then fastened by washer 19 and nut 22.

Figure 15:
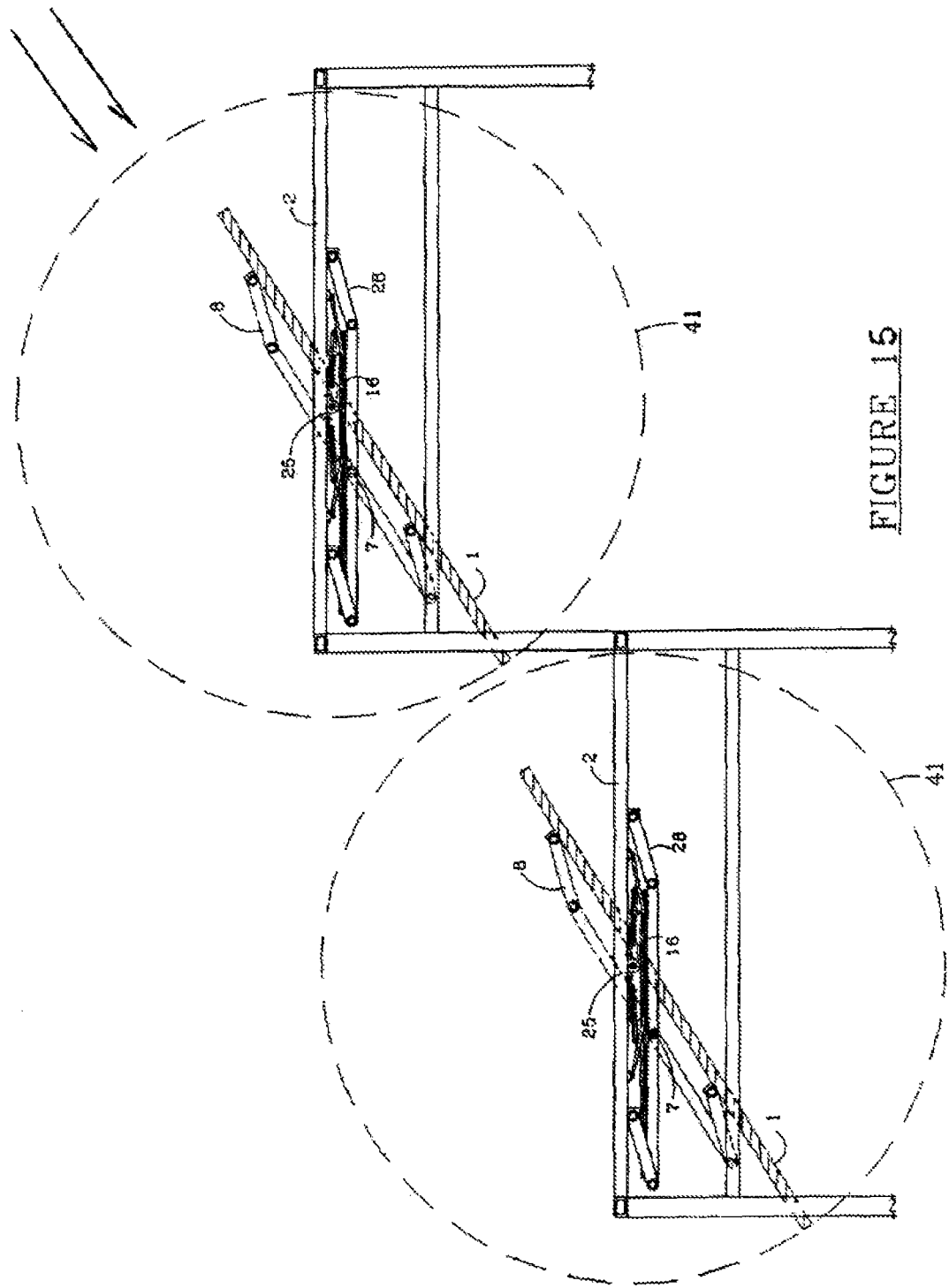
FIG. 15 shows a stepped frame supporting two solar panels.

FIG. 15 shows a plurality of main frames 40 arranged in a stepped configuration for supporting a plurality of solar panels 1 respectively. According to the illustrated embodiment, the solar panel supporting system is adapted to support two solar panels 1, 1 on two main frames 2, 2 respectively at different levels. The stepped frame 40 is configured to prevent the two solar panels 1, 1 from touching and hitting each other while pivoting within a circle 41.

While the present application has been shown and described with particular references to a number of preferred embodiments thereof, it should be noted that various other changes or modifications may be made without departing from the scope of the present application.

What is claimed is:

1. A solar panel supporting system comprising:
a main frame comprising two opposite lateral sides;
a solar panel pivotally mounted on the main frame along a first pivot axis defined by a first rod extending between the opposite lateral sides of the main frame;
a spring mechanism operatively coupled to the solar panel for resiliently maintaining the solar panel at a predetermined position, the solar panel adapted to pivot in response to wind strong enough to stretch or compress the spring mechanism and return to the position when wind diminishes; and
a first collapsible frame hingedly connected to a lower surface of the solar panel and defining a first parallelogram collapsible frame structure, the solar panel being pivotally coupled to the main frame along a second pivot axis defined by a second rod extending through a lower frame member of the first collapsible frame parallel to the solar panel and between the opposite lateral sides of the main frame;
a second collapsible frame hingedly connected to an upper frame member of the main frame at each lateral side thereof and defining a second parallelogram collapsible frame structure, each of the two opposite ends of the second rod being attached to a lower frame member of the second collapsible frame parallel to the upper frame member of the main frame.

2. The solar panel supporting system as claimed in claim 1, wherein the spring mechanisms comprises a pair of compression springs operatively coupled to the first collapsible frame, each compression spring being disposed at each opposite side of the first and second pivot axes, each compression spring comprising one end hingedly connected to the solar panel and the other end hingedly connected to a bar, each bar comprising one end hingedly connected to the solar panel and the other end slidably coupled to a track by a roller bearing assembly, the track being provided on the lower frame member of the first collapsible frame parallel to the solar panel.

3. The solar panel supporting system as claimed in claim 2, wherein the solar panel is adapted to pivot clockwise or anticlockwise up to about 90 degrees from the predetermined position.

4. The solar panel supporting system as claimed in claim 1, wherein the spring mechanisms further comprises a pair of compression springs operatively coupled to the second collapsible frame, each compression spring being disposed at each opposite side of the first and second pivot axes, each compression spring comprising one end hingedly connected to the upper frame member of the main frame and the other end hingedly connected to a bar, each bar comprising one end hingedly connected to the upper frame member of the main frame and the other end slidably coupled to a track by a roller bearing assembly, the track being provided on the lower frame member of the second collapsible frame parallel to the upper frame member of the main frame.

5. The solar panel supporting system as claimed in claim 4, wherein the solar panel is adapted to pivot clockwise or anticlockwise more than 90 degrees and up to about 180 degrees from the predetermined position.

6. A solar panel supporting system comprising:
a main frame comprising two opposite lateral sides;
a solar panel pivotally mounted on the main frame along a first pivot axis defined by a first rod extending between the opposite lateral sides of the main frame;
a pair of tension springs provided at two opposite sides of the first pivot axis respectively at each lateral side of the main frame, each pair of tension springs being connected to and extending between the solar panel and the main frame, the tension springs being operatively coupled to the solar panel for resiliently maintaining the solar panel at a predetermined position, the solar panel adapted to pivot in response to wind strong enough to stretch the tension springs and return to the position when wind diminishes;

a first collapsible frame hingedly connected to a lower surface of the solar panel and defining a first parallelogram collapsible frame structure, the solar panel being pivotally coupled to the main frame along a second pivot axis defined by a second rod extending between the opposite lateral sides of the main frame and through a lower frame member of the first collapsible frame parallel to the solar panel; and a second collapsible frame hingedly connected to an upper frame member of the main frame at each lateral side thereof and defining a second parallelogram collapsible frame structure, each of the two opposite ends of the second rod being attached to a lower frame member of the second collapsible frame parallel to the upper frame member of the main frame, a pair of compression springs operatively coupled to the second collapsible frame, each compression spring being disposed at each opposite side of the first and second pivot axes, each compression spring comprising one end hingedly connected to the upper frame member of the main frame and the other end hingedly connected to a bar, each bar comprising one end hingedly connected to the upper frame member of the main frame and the other end slidably coupled to a track by a roller bearing assembly, the track being provided on the lower frame member of the second collapsible frame parallel to the upper frame member of the main frame.

* * * * *